United States Patent
Kim et al.

(10) Patent No.: US 7,577,460 B2
(45) Date of Patent: Aug. 18, 2009

(54) PORTABLE COMPOSITE COMMUNICATION TERMINAL FOR TRANSMITTING/RECEIVING AND IMAGES, AND OPERATION METHOD AND COMMUNICATION SYSTEM THEREOF

(75) Inventors: Jae-Min Kim, Suwon-shi (KR); Jeong-Seok Oh, Yong-in-shi (KR); Sang-Ryul Park, Taegu-Kwangyokshi (KR)

(73) Assignee: Samsung Electronics Co., Ltd (KR)

( * ) Notice: Subject to any disclaimer, the term of this patent is extended or adjusted under 35 U.S.C. 154(b) by 547 days.

(21) Appl. No.: 11/493,754

(22) Filed: Jul. 26, 2006

(65) Prior Publication Data

US 2007/0123302 A1 May 31, 2007

Related U.S. Application Data

(62) Division of application No. 11/003,222, filed on Dec. 3, 2004, which is a division of application No. 09/540,830, filed on Mar. 31, 2000, now Pat. No. 7,139,014.

(30) Foreign Application Priority Data

Mar. 31, 1999 (KR) ............................... 1999-11179

(51) Int. Cl.
*H04M 11/00* (2006.01)
*H04N 7/14* (2006.01)

(52) U.S. Cl. .............. 455/556.1; 455/556.2; 455/575.1; 348/14.02

(58) Field of Classification Search .............. 455/556.1, 455/556.2, 550.1, 575.1, 575.3, 575.4, 412.1; 348/14.01, 14.02, 14.09, 14.11–14.16; 379/93.24, 379/90.01; 709/204, 206

See application file for complete search history.

(56) References Cited

U.S. PATENT DOCUMENTS

| 5,381,460 | A | 1/1995 | Ohashi et al. |
| 5,491,507 | A | 2/1996 | Umezawa et al. |
| 5,636,315 | A | 6/1997 | Sugiyama et al. |
| 5,757,346 | A | 5/1998 | Mita |
| 5,806,005 | A | 9/1998 | Hull et al. |
| 5,825,408 | A | 10/1998 | Yuyama et al. |

(Continued)

FOREIGN PATENT DOCUMENTS

JP 06233295 8/1994

(Continued)

*Primary Examiner*—Melur Ramakrishnaiah
(74) *Attorney, Agent, or Firm*—The Farrell Law Firm, LLP

(57) ABSTRACT

A method of operating a portable composite communication terminal the functions as both a portable phone and a camera. The method includes: setting a portable phone mode by turning on the portable composite communication terminal, regulating voltage supporting components of the portable phone mode, and performing a general portable phone function; setting a camera mode by turning on the camera in said portable phone mode upon user request for camera operation, said user request being input through a camera mode switch and processed by the controller, regulating voltage supporting components of the camera mode, and performing a camera function; capturing the image of an object upon user request for a photograph in the camera mode; and displaying a captured image stored in a camera memory of the portable composite communication terminal on a display of the portable composite communication terminal upon user request for displaying the image.

1 Claim, 10 Drawing Sheets

U.S. PATENT DOCUMENTS

| | | |
|---|---|---|
| 5,969,750 A | 10/1999 | Hsieh et al. |
| 6,009,336 A | 12/1999 | Harris et al. |
| 6,044,403 A | 3/2000 | Gerszberg et al. |
| 6,069,648 A | 5/2000 | Suso et al. |
| 6,169,911 B1 | 1/2001 | Wagner et al. |
| 6,192,257 B1 | 2/2001 | Ray |
| 6,252,588 B1 | 6/2001 | Dawson |
| 6,259,469 B1 | 7/2001 | Ejima et al. |
| 6,370,546 B1 * | 4/2002 | Kondo ........................ 707/201 |
| 6,377,818 B2 | 4/2002 | Irube et al. |
| 6,427,078 B1 * | 7/2002 | Wilska et al. ............ 455/550.1 |
| 6,501,968 B1 | 12/2002 | Ichimura |

FOREIGN PATENT DOCUMENTS

| | | |
|---|---|---|
| JP | 10-065780 | 3/1998 |
| JP | 10-98511 | 4/1998 |
| JP | 10-336238 | 12/1998 |

* cited by examiner

PORTABLE COMPOSITE COMMUNICATION TERMINAL FOR TRANSMITTING/RECEIVING AND IMAGES, AND OPERATION METHOD AND COMMUNICATION SYSTEM THEREOF

PRIORITY

This application is a Divisional Application of U.S. patent application Ser. No. 11/003,222, filed Dec. 3, 2004 which is a Divisional of U.S. patent application Ser. No. 09/540,830, filed Mar. 31, 2000 now U.S. Pat. No. 7,139,014 which claims priority to an application entitled "Portable Composite Communication Terminal for Transmitting/Receiving Voice and Images, and Operation Method and Communication System Thereof" filed in the Korean Industrial Property Office on Mar. 31, 1999 and assigned Ser. No. 1999-11179, the contents of which are incorporated herein by reference.

BACKGROUND OF THE INVENTION

1. Field of the Invention

The present invention relates generally to the field of wireless communications, and in particular, to a portable composite communication terminal for transmitting/receiving voice and images and a communication method and system thereof.

2. Description of the Related Art

With the rapid development of information in society, there is an increasing demand for a composite communication terminal having functions in addition to a communication terminal solely for voice transmission. Currently, mobile phones can transmit voice and text messages between the mobile phone and a base station. In addition, there exist digital cameras, which can take and store images digitally. However, there are no devices, which can take digital images and transmit them to another device. Therefore, there exists a need for a device, which can take digital images and transmit them to another device. A mobile video phone (MVP), according to the present invention, can provide voice and image transmission services that will meet the demands of users in the multimedia era. The MVP is equipped with a digital camera function in addition to the functions of a typical portable communication terminal (e.g., portable phone). A user can therefore photograph an object or images as needed in business and store the photographs in the device. The MVP may also function as a radio transmitter and therefore the user can transmit/receive a desired image without logging into a personal computer (PC).

SUMMARY OF THE INVENTION

It is, therefore, an object of the present invention to provide a portable composite communication terminal, which can transmit/receive voice and images.

It is another object of the present invention to provide a communication method and system for a portable composite communication terminal, which can transmit/receive voice and images.

These and other objects are achieved by providing a communication system for voice communication and image transmission/reception. The communication system includes a portable composite communication terminal, such as a mobile video phone (MVP), a mobile communication network, and a server. The portable composite communication terminal has a camera unit for digitally capturing the image of an object, constructing the image in a predetermined format, compressing the formatted image, and storing the compressed image in the camera memory under a predetermined camera control, a portable phone unit for providing overall control to the mobile video phone and selectively performing voice communication and image transmission/reception according to a selected transmission mode among predetermined modes, a display for displaying images and characters under the control of the portable phone unit, and an interface unit for interfacing between the portable phone unit and the display to display images and characters on the display under the control of the portable phone unit. The mobile communication network transmits/receives voice and images to/from the portable composite communication terminal. The server is connected to the mobile communication network and provides transmission/reception service of image data over the mobile communication network.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
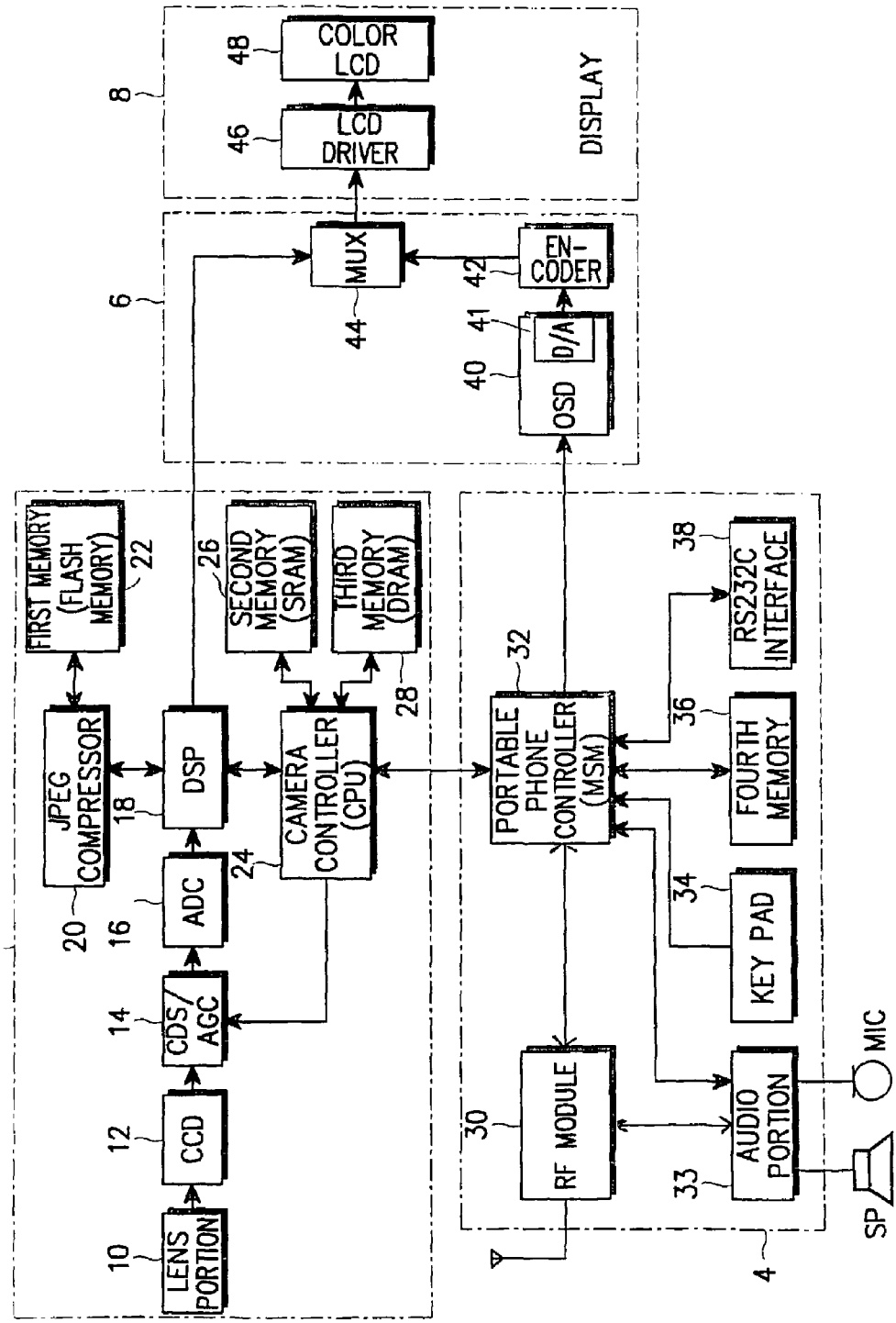
FIG. 1 is a block diagram of a portable composite communication terminal for transmission of voice and images according to an embodiment of the present invention.

FIG. 1 is a block diagram of a portable composite communication terminal (hereinafter, referred to as mobile video phone: MVP) capable of transmitting voice and images according to an embodiment of the present invention. The MVP includes a camera unit 2 for capturing the image of an object, a portable phone unit 4 for transmitting/receiving voice or images, a display 8 for displaying images and characters, and an interface unit 6 for interfacing between the portable phone unit 4 and the display 8.

The camera unit 2 can be configured out of a digital still video camera in the MVP of FIG. 1. The structure and operation of the MVP according to the embodiment of the present invention will be described hereinbelow.

An image captured from an object is applied to a CCD (Charge Coupled Device) 12 through a lens portion 10. The lens portion 10 may include a zoom lens, a focus lens, and an iris, which are usually used for a digital still video camera. The lens portion 10 is simplified to enable a user to carry the MVP with more convenience in accordance with the embodiment of the present invention. Specifically, mechanical devices and circuits like the zoom lens, a zoom lens driver, and an iris driver are omitted. The iris is used with a iris aperture size fixed to a predetermined degree due to the absence of the iris driver. However, the lens portion 10 can include all or some of the components of a typical lens portion including the zoom lens, the focus lens, the iris, and their drivers, as needed.

The CCD 12 converts an optical signal of the object that passes through the lens portion 10 to an electrical signal (captured image signal) and a CDS/AGC (Correlated Double Sampling/Automatic Gain Control) 14 correlated-double samples the captured image signal and controls the gain of the captured image signal. Noise produced in the CCD 12 is removed from the captured image signal by the correlated double sampling in the CDS/AGC 14. The CCD 12 and the CDS/AGC 14 can be configured on typical CMOS (Complementary Metal Oxide Semiconductor) sensor chips. An ADC (Analog-to-Digital Converter) 16 converts the gain-controlled image signal of one field received from the CDS/AGC 14 to a digital signal. A DSP (Digital Signal Processor) 18 processes the digital signal received from the ADC 16 into an Y, C image signal of an NTSC (National Television System Committee) or PAL (Phase Alternation by Line) format. The DSP 18 feeds the Y, C image signal to a JPEG (Joint Picture Expert Group) compressor 20 or the display 8 for displaying the Y, C image signal on a color graphic LCD (Liquid Crystal Display) 48 (hereinafter, referred to as a color LCD 48), under the control of a portable phone controller 32. Components Y and C of the Y, C image signal are a luminance signal and a chrominance signal, respectively.

For the DSP 18 to store the Y, C image signal in a first memory 22 through the JPEG compressor 20 or feed the Y, C image signal to the display 8, an object is captured as a still image upon the user pressing a shutter key of the MVP in a camera mode. The DSP 18 applies the captured Y, C image signal to the first memory 22 through the JPEG compressor 20. On the other hand, if the shutter key is not entered in the camera mode, the DSP 18 temporarily stores the Y, C image signal in a third memory 28 through a camera controller 24 and then the stored Y, C image signal is displayed on the color LCD 48 through the camera controller 24, the DSP 18, a selector 44, and an LCD driver 46. The user can view the object in the viewfinder of the MVP on the color LCD 48.

The JPEG compressor 20 converts the captured Y, C image signal received from the DSP 18 to a JEPG formatted image signal and compresses the JEPG-formatted image signal to a predetermined size, under the control of the camera controller 24. Then, the first memory 22 stores the compressed image signal. The JPEG compressor 20 also decompresses the compressed image stored in the first memory 22 and applies the decompressed image to the DSP 18, under the control of the camera controller 24. For example, the JPEG compressor 20 compresses a 640×480 VGA (Video Graphics Array) signal to its ⅛ size. The 640×480 image occupies about 300 Kbytes, one eighth of which is about 40 Kbytes. The first memory 22 is a flash memory, for storing the compressed image received from the JPEG compressor 20. The capacity of the first memory 22 is adjusted according to the amount of captured image data, preferably to tens of pages (e.g., 50 pages) of captured images.

The camera controller 24 is a CPU (Central Processing Unit) and provides overall control to the camera unit 2. Upon receipt of a signal corresponding to a key input through a key pad 34 under the control of the portable phone controller 32, the camera controller 24 performs a corresponding operation. A second memory 26 connected to the camera controller 24 is usually an SRAM (Static Random Access Memory), for storing programs executed in the camera controller 24. The third memory 28 connected to the camera controller 24 is usually a DRAM (Dynamic Random Access Memory), acting as a buffer for temporarily storing an image received through the camera lens.

Now, the structure and operation of the portable phone unit 4 in the MVP of FIG. 1 will be described. The portable phone controller 32 provides overall control to the portable phone unit 4. The portable phone controller 32 operates the portable phone unit 4 or the camera unit 2 upon receipt of user key input, or stores an intended image received from the camera unit 2 in a fourth memory 36. In addition, the portable phone controller 32 controls an OSD (On Screen Display) 40 of the interface unit 6 to display desired characters or a background image on the color LCD 48 of the display 8. The portable phone controller 32 can be configured on an MSM (Mobile Station MODEM) chip of Qualcomm, for example.

The key pad 34 is provided with digit keys and function keys usually used in a typical portable phone, and keys necessary to photograph and play back images. Key data corresponding to user key input in the key pad 34 is applied to the portable phone controller 32. The keys for photographing and playing back images include a photography/play key, a mode key for selecting a camera environment, a shutter key, an enter key for setting a camera environment selected by the mode key, and a switch for turning on/off a camera. Some of the keys in the portable phone are used in a camera mode.

Figure 3:
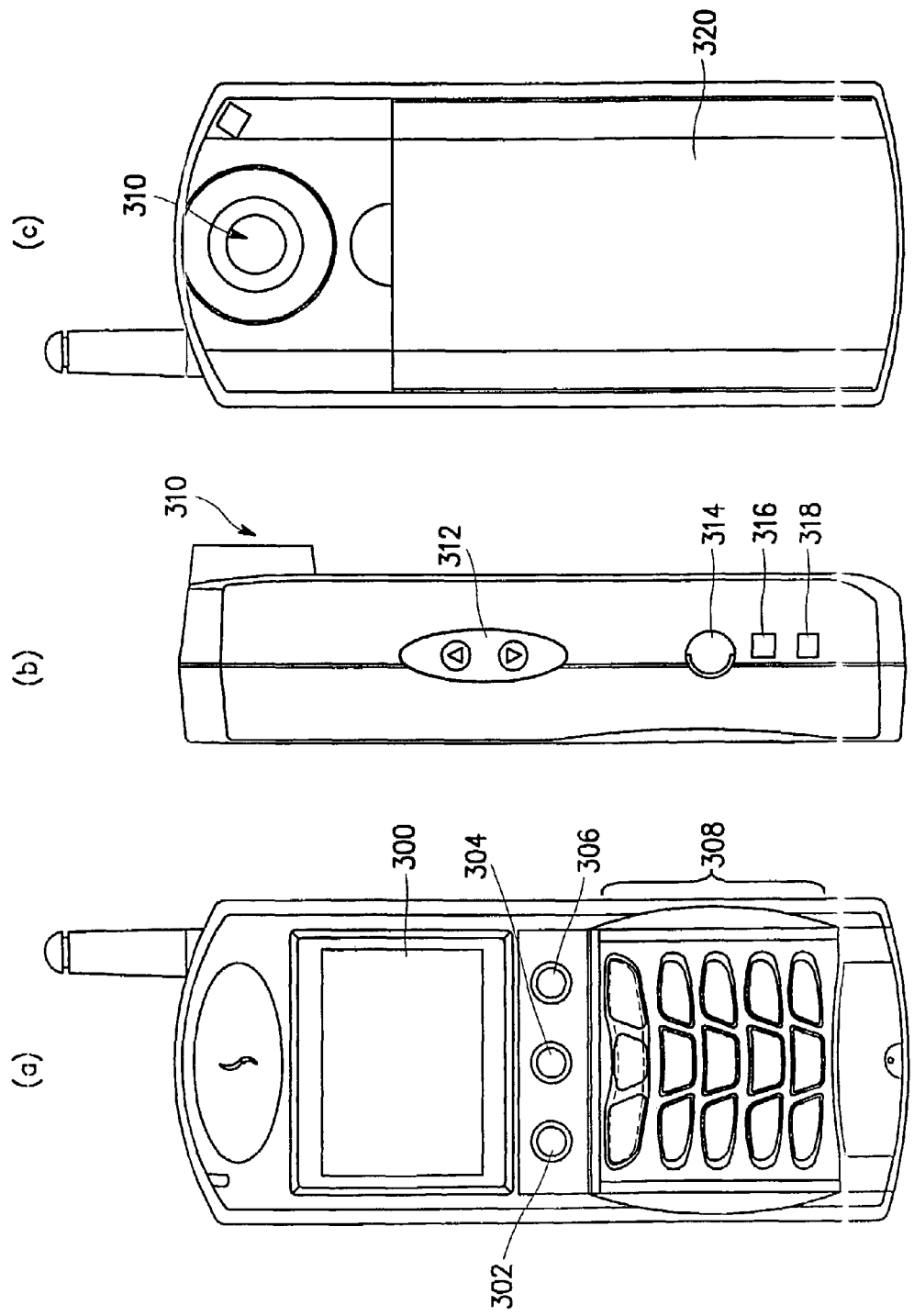
FIGS. 3A, 3B, and 3C illustrate an external view of the portable composite communication terminal according to the embodiment of the present invention.

FIGS. 3A, 3B, and 3C are a frontal view, left side view, and rear view respectively of the MVP according to the embodiment of the present invention.

Arrangement of the keys in accordance with the embodiment of the present invention will be described referring to FIGS. 3A and 3B. Reference numeral 300 denotes a display window being a color LCD. The display window 300 is used as a view finder in a camera mode. Reference numeral 308 denotes the digit keys and the function keys provided to a typical portable phone. Keys 302, 304, and 306 above the keys 308 are used as a mode key, a shutter key, and an enter key, respectively, for photography and play. The mode key 302 selects a (partial or whole) delete function mode, a date function mode, a (fine or normal) display function mode, and a sensitivity function mode. The sensitivity of a still image is digitally controlled in the sensitivity function mode.

It is preferable that a flip (not shown in FIG. 3A) of the MVP according to the embodiment of the present invention covers only the digit and function keys 308, with the mode key 302, the shutter key 304, and the enter key 306 exposed outward, so that a user can photograph and reproduce an image using the keys 302, 304, and 306 without opening the flip of the MVP.

Reference numeral 316 denotes a photography/play key on the left side of the MVP, and reference numeral 314 denotes an RS232C jack above the photography/play 316, for a user to download a still image from a PC or upload a still image of the MVP to the PC. Reference numeral 312 denotes a volume up/down key for the portable phone. Upon user pressing the volume up/down key 312 in a play sub-mode of the camera mode, an image previous or next to a current image is displayed. Here, the play sub-mode refers to a mode for displaying a still image selected by the user among still images captured and stored on the color LCD 48. Reference numeral 310 in FIGS. 3A and 3B denotes a camera lens. The camera lens 310 is disposed at an upper portion of the rear side of the MVP in accordance with the embodiment of the present invention. Under the camera lens 310 is located a battery 320.

While the MVP is a flip type in FIGS. 3A, 3B, and 3C, it can be of a folder type or any other type.

Returning to FIG. 1, the fourth memory 36 connected to the portable phone controller 32 includes an EEPROM (Electrically Erasable and Programmable Read Only Memory), a flash ROM, and a RAM. Variables needed for executing programs are stored in the EEPROM, and data needed for controlling the portable phone is stored in the RAM. Operation programs, application programs, Internet protocols, radio link protocols, and CDMA (Code Division Multiple Access) protocols are mapped in the ROM. The application programs include programs for additional functions such as voice dialing, character recognition, PIM (Personal Information Management), and games, data functions such as browsing, E-mailing, and facsimile, and a user interface function such as GUI (Graphic User interface). The Internet protocols are a protocol for connecting the MVP to a PPP (Point to Point Protocol) server and a protocol used over an Internet. TCP/IP/PPP (Transmission Control Protocol/Internet Protocol/Point to Point Protocol) is an example of the Internet protocols. The radio link protocols include an IS-657 packet data communication protocol and an RLP (Radio Link Protocol). The RLP is a protocol for converting general data for use in a CDMA protocol and recovering the general data. The CDMA protocols are an IS-95A CDMA protocol for 800 MHz, a J-STD-008 CDMA protocol for 1.8 GHz, and an IS-95B protocol at 64-114 Kbps.

An area for storing part of user-intended data or images prior to radio transmission is reserved in the flash ROM, besides the programs and protocols. Though a large capacity buffer is required to store the entire page of images, the flash ROM of the fourth memory 36 assigns a small capacity buffer size, for example, of 600 bytes to store image data received by 512 byte units from the camera controller 24.

An audio portion 33 converts an analog voice signal received through a microphone (MIC) to a radio signal and feeds the radio signal to an RF (Radio Frequency) module 30, under the control of the portable phone controller 32. The audio portion 33 also demodulates a radio signal received from the RF module 30 and outputs a voice signal through a speaker (SP), under the control of the portable phone controller 32. The RF module 30 downconverts and demodulates an RF signal received through an antenna and outputs the demodulated signal to the audio portion 33. The RF module 30 also modulates and upconverts a signal received from the audio portion 32 to an RF signal and wireless transmits the modulated signal through the antenna. A signal transmitted/received to/in the RF module 30 can be image and character data as well as a voice signal.

The RS232C interface 38 connected to the portable phone controller 32 is an interface for downloading/uploading a still image from/to a PC.

In FIG. 1, the interface unit 6 has the OSD (On Screen Display) 40, an encoder 42, and the selector 44.

The OSD 40 performs an OSD control operation for displaying characters or a background image downloaded from a PC on the color LCD 48 of the display 8, and outputs an R, G, B image signal, for example, an 8-bit digital signal. The DAC (Digital to Analog Converter) 41 converts the digital R, G, B signal received from the OSD 40 to an analog signals, and the encoder 42 encodes the analog R, G, B signal to an NTSC or PAL Y, C signal. The selector 44 is an analog multiplexer (MUX), for selecting the external image Y, C signal received from the DSP 18 of the camera unit 2 or the OSD image Y, C signal received from the encoder 42 and feeding the selected image signals to the display 8. The display 8 includes the LCD driver 46 and the color LCD and displays characters and images on the color LCD 48.

Figure 2:
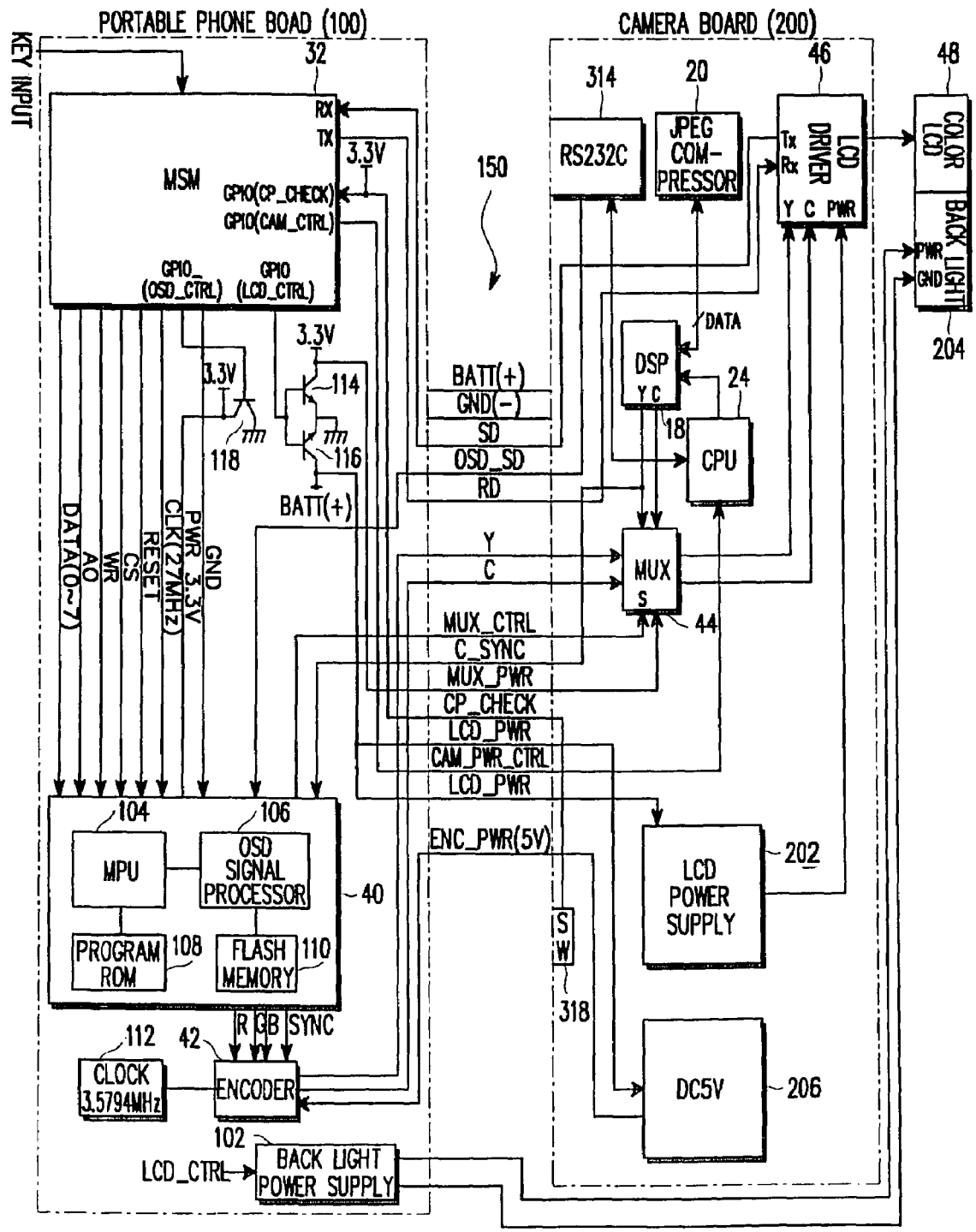
FIG. 2 is a schematic diagram of the portable composite communication terminal according to the embodiment of the present invention.

FIG. 2 illustrates two boards, namely, a portable phone board 100 and a camera board 200 in which the components shown in FIG. 1 are separately arranged according to the embodiment of the present invention. Referring to FIG. 2, while the RF module 30, the audio portion 33, the key pad 34, and the fourth memory 36 of the portable phone unit 4 shown in FIG. 1 are not shown in the portable phone board 100 and the CCD 12, the CDS/AGC 14, the ADC 16, the JPEG compressor 20, and the first, second, and third memories 22, 26, and 28 of the camera unit 2 shown in FIG. 1 are not shown in the camera board 200, it is to be noted that each board is provided with its corresponding components or circuit blocks.

Furthermore, it is also to be appreciated that a battery power voltage BATT(+) is 3.6V and an operational power ranges between 2.8 and 4.3V by way of example in FIG. 2. A regulator outputs 3.3V or any other voltage for the input of the battery power voltage 3.6V, and a power voltage being tens of volts is supplied through a DC/DC converter.

Both the portable phone board 100 and the camera board 200 shown in FIG. 2 are provided with a DC/DC converter (not shown) so that the two boards can operate together or individually. A connection unit 150 having a plurality of lines connects the two boards 100 and 200, for implementing a reliable operation and transmitting an operational command and images between boards 100 and 200.

In accordance with the embodiment of the present invention, a battery power line Batt (+) is connected between a power supply of the portable phone board 100 and a power supply of the camera board 200 to use a battery of a conventional portable phone for both the portable phone board 100 and the camera board 200. A ground line GND is connected between the boards 100 and 200 for stable operation. Data transmission and reception lines SD and RD are connected between the portable phone controller 32 and the camera controller 24 using UART (Universal Asynchronous Receiver/Transmitter) ports, for communicating commands and data between them. The portable phone controller 32 orders all operations of the camera unit 2, including photography and reproduction, determines whether the ordered operations are performed reliably, and communicates image data for image transmission, through the data transmission and reception lines SD and RD. Key data related with camera operations received through the key pad 34 of FIG. 1 under the control of the portable phone controller 32 is applied to the camera controller 24 through the data transmission and reception lines SD and RD.

According to the embodiment of the present invention, the camera board 200 of the MVP includes a camera on/off switch 318 and an RS-232C jack 314 for downloading/uploading data from/to a PC. The camera on/off switch 318 has an end grounded and the other end connected to a line CP_CHECK that is in turn connected to a port GPIO (CP_CHECK) of the portable phone controller 24. A power voltage 3.3V, for example, is connected to the line CP_CHECK through a resistor. A line CAM_PWR_CTRL is connected between a port GPIO(CAM_CTRL) of the portable phone controller 32 and the camera controller 24, so that the portable phone controller 32 can sense a user pressing the camera on/off switch 318 through the line CP_CHECK, controls the camera controller 24 through the line CAM_P-WR_CTRL, and thus turns on/off the camera unit 2. Only a leakage current of several mili-amperes (mA) is applied to the camera unit 2 to prevent the misoperation of the camera controller 24 when the camera unit 2 turns off. When the user turns off the camera unit 2 with the camera on/off switch 318, the camera controller 24 terminates the operation of the camera unit 2 by using the leakage current. The operations of circuits and mechanical devices in the camera unit 2 are controlled by the camera controller 24, which is in turn controlled by the portable phone controller 32.

Meanwhile, an LCD power supply 202 is provided to the camera board 200, for supplying a power voltage to the LCD driver 46 and the color LCD 48, and a back light power supply 102 is provided to the portable phone board 100, for supplying a power voltage to an LCD back light 204. The portable phone controller 32 controls the on/off state of LCD power supply 202 to reduce the power dissipation associated with the operation of the color LCD 48. That is, a port GPIO (LCD_CRTL) on the portable phone controller 32 is connected to the bases of a first and a second transistor 114 and 116. The first transistor 114 has a collector to which 3.3V is applied and an emitter grounded. A line MUX_PWR is connected between the collector of the first transistor 114 and the selector 44, for supplying 3.3V to selector 44. The second transistor 116 has a collector connected to the battery power voltage BATT(+) and an emitter connected to ground. A line LCD_PWR is connected between the collector of the second transistor 116 and the LCD power supply 202 and between the collector of the second transistor 116 and a DC (Direct Current) power supply 206. Hence, the portable phone controller 32 can control the LCD power supply 202 and the DC power supply 206 by use of the port GPIO(LCD_CTRL). A line ENC_PWR connects the DC power supply 206 of the camera board 200 to the encoder 42 of the portable phone board 100, for supplying a DC power voltage to the encoder 42.

While the LCD driver 46, the LCD power supply 202, the selector 44, and the DC power supply 206 are located on the camera board 200 in the embodiment of the present invention, they can be on the portable phone board 100 when necessary.

As shown in FIG. 2, the OSD 40 in the interface unit 6 includes a main processing unit (MPU) 104, an OSD signal processor 106, a program ROM 108, and a flash memory 110. Each component block can be configured with a chip.

The MPU 104 provides overall control to the OSD 40. The OSD signal processor 106 displays an intended character at a specific position of a current displayed still image on the color LCD 48 in synchronization with an external color sync signal C_Sync (included in the luminance signal Y) received from the DSP 18, or displays only characters or a downloaded background image on the color LCD 48 in synchronization with an internal color sync signal C_Sync. Operation programs, fonts, and icons are mapped in the program ROM 108, and a plurality of pages of background images downloaded from a PC are stored in the flash memory 110.

The OSD signal processor 106 is preferably configured with an ASIC (Application Specific Integrated Circuit), and its structure and operation will be described in more detail below. Since a conventional method of displaying characters on a black and white character-type LCD does not apply to the color LCD 48 of the present invention, the OSG signal processor 106 converts intended characters and images to a form suitable for the color LCD 48 using data DATA 0-7, address A0, a write signal WR, a chip select signal CS, and a reset signal RESET, for example, from an MSM chip of the conventional portable phone controller 32. In order to convert the characters and images, the OSD signal processor 106 receives a clock signal CLK (e.g., 27 MHz) used in the MSM chip from the portable phone controller 32. The portable phone controller 32 can turn on/off 3.3V supplied to the OSD 40 through an internal port GPIO(OSD_CTRL). That is, a third transistor 118 has a base connected the port GPIO(OSD_CTRL) of the MSM chip being the portable phone controller 32, an emitter grounded, and a collector connected to the OSD signal processor 106 through a PWR 3.3V line. A power voltage 3.3V is applied to the collector of the third transistor 118. Thus, the portable phone controller 32 can turn on/off 3.3V to/from the OSD 40 through the port6 GPIO(OSD_CRL).

A line OSD_SD connects the RS232C jack 314 of the camera board 200 to the OSD signal processor, so that the user can download a desired still image from the PC utilizing the RSC232C jack 314 for use as a background on the color LCD 48.

The OSD signal processor 106 operates under the control of the MPU 104 of the OSD 40 and outputs an R, G, B signal and a color sync signal C_Sync. The R, G, B signal is an 8-bit digital signal for representing 256 colors (R: 3 bits, G: 3 bits, and B: 2 bits).

Synchronization should be provided to the camera of the MVP in order to represent desired characters in an image, which is being photographed or played back. For this purpose, a line C_Sync is connected between the DSP 18 and the OSD signal processor 106, so that the DSP 18 applies the external color sync signal C_Sync to the OSD signal processor 106 as a color sync signal for the current photographed or retrieved image data. The OSD signal processor 106, synchronized to the external color sync signal C_Sync, controls a specific character in a predetermined area of an image displayed on the color LCD 48.

The OSD signal processor 106 includes an internal sync signal generator (not shown). The internal sync signal generator generates the internal sync signal C_Sync for displaying a background image or characters on the color LCD 48 in a portable phone mode because the DSP 18 does not output the external sync signal C_Sync in the portable phone mode.

The D/A converter 41 of FIG. 1 converts the 8-bit digital R,G,B signal received from the OSD signal processor 106 to an analog signal. For the input of the analog R,G,B signal from DAC 41 and the color sync signal C_Sync from the OSD signal processor 106, the encoder 42 outputs an OSD image Y,C signal in response to a clock signal at 3.5794 MHz received from the clock signal generator 112.

3.3V are applied to the selector 44 through a line MUX_PWR. The line MUX_PWR is connected to the collector of the first transistor 114, to which 3.3V is applied. The first transistor 114 has an emitter grounded and a base connected to a port GPIO(LCD_CRTL) of the portable phone controller 32. The portable phone controller 32 controls 3.3V to selectively be applied to the selector 44 through the port GPIO (LCD_CTRL).

The image Y, C signal output from the DSP 18 of the camera unit 2 or the image Y, C signal output from the encoder 42 is selectively fed to the display 8. The OSD signal processor 106 controls the selection in the selector 44 through a line MUX_CTRL connected between the OSD signal processor 106 and the selector 44. The OSD signal processor 106 controls the selector 44 to select the OSD image Y, C signal received from the encoder 42 through the line MUX_CTRL at the time when characters or a background image needs to be output.

A detailed description of a control operation in the MVP according to the embodiment of the present invention will be given in connection to FIGS. 1 to 6. Referring now to FIG. 6, there is shown a flowchart illustrating an operation control procedure in the MVP according to the embodiment of the present invention. When a user turns on the MVP in step 600, the portable phone controller 32 enters a portable phone mode in step 602. Then, the portable phone controller 32 controls a portable phone operational power voltage to be supplied in step 604. That is, the power voltage is supplied to the portable phone unit 4, the selector 44 of the interface unit 6, and the display 8. In step 606, the portable phone controller 32 performs a function related with a typical portable phone. A power voltage is not supplied to the other circuits and device drivers of the camera unit 2 except for the camera controller 24 in the portable phone mode.

Referring back to FIG. 2, for supply of the power voltage in the portable phone mode, the portable phone controller 32 controls the power voltage to be supplied to the LCD power supply 202, the DC power supply 206, the back light power supply 102, and the selector 44 through the port GPIO(LCD_CTRL). Therefore, the power voltage is applied to the selector 44, the LCD power supply 202 applies the power voltage to the LCD driver 46 and the color LCD 48, the DC power supply 206 applies the power voltage to the encoder 42, and the back light power supply 102 applies the power voltage to a back light 204. The power voltage is also supplied (not shown) to the camera controller 24 of the camera unit 2.

Upon request for E-mail transmission in the portable phone mode in step 608, the portable phone controller 32 enters an E-mail transmission sub-mode in step 610.

Meanwhile, when the camera function in the MVP is used, the user turns on the camera on/off switch 318 on the left side of the MVP. The portable phone controller 32 senses the on-state of the camera on/off switch 318 in step 612 and enters a camera mode in step 614. Then, the portable phone controller 32 controls the camera controller 24 in order to supply a power voltage to the camera unit 2 in step 616 and controls the OSD 40 to display a message indicating the camera mode in graphics or characters on the color LCD 48 in step 618.

If the user presses the photography/play key 316 on the left side of the MVP in the camera mode in step 620, the portable phone controller 32 checks whether user presses the photography/play key 316 again in step 622, if not, the controller 32 enters a photography sub-mode in step 624. If the photography/play key 316 is entered for the second time, the portable phone controller 32 enters a play sub-mode in step 626. Every time the user presses the photography/play key 316, the photography sub-mode and the play sub-mode are toggled.

Figure 6:
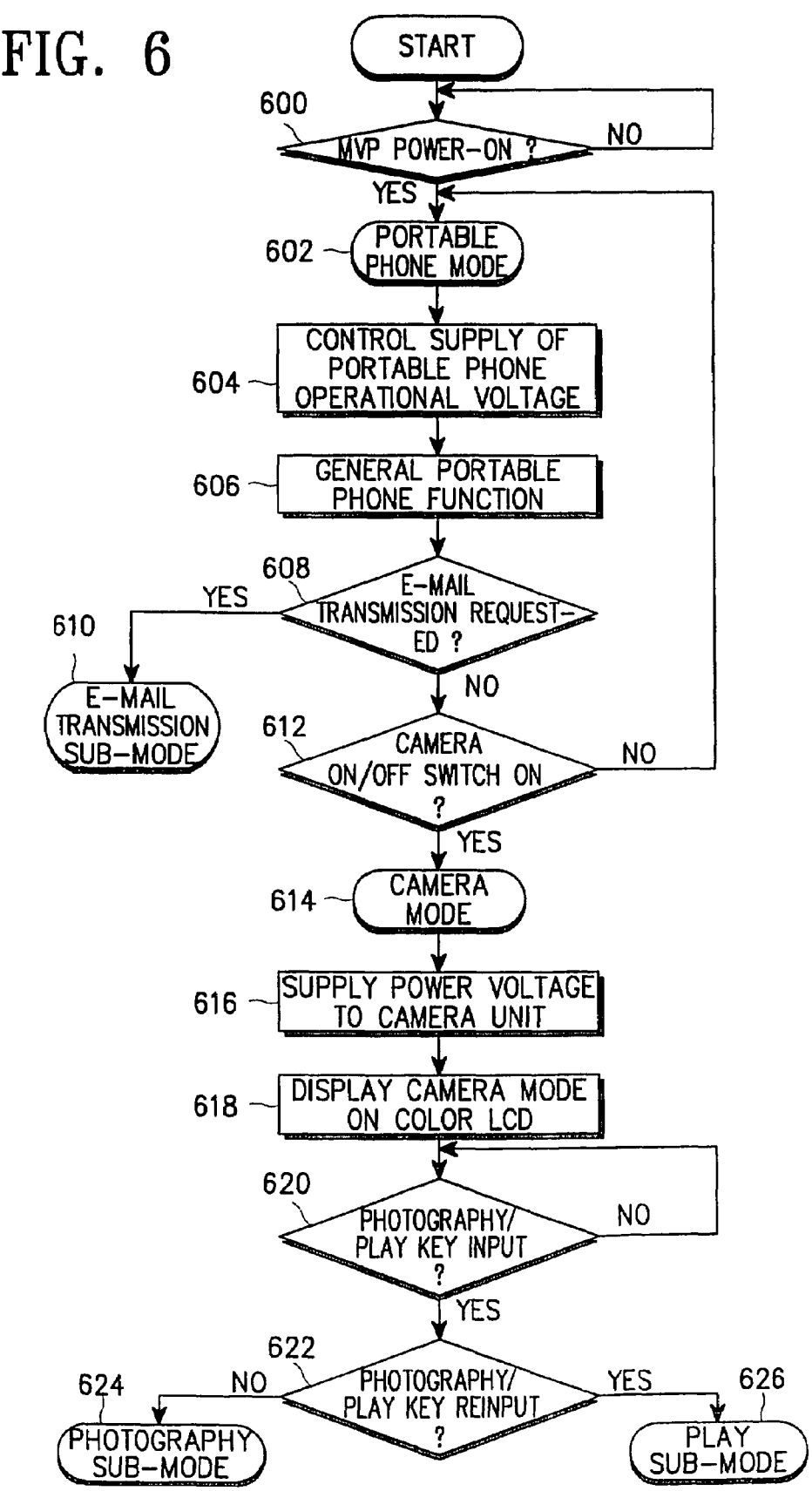
FIG. 6 is a flowchart depicting a control operation of the portable composite communication terminal in a portable phone mode and a camera mode according to the embodiment of the present invention.
Figure 7:
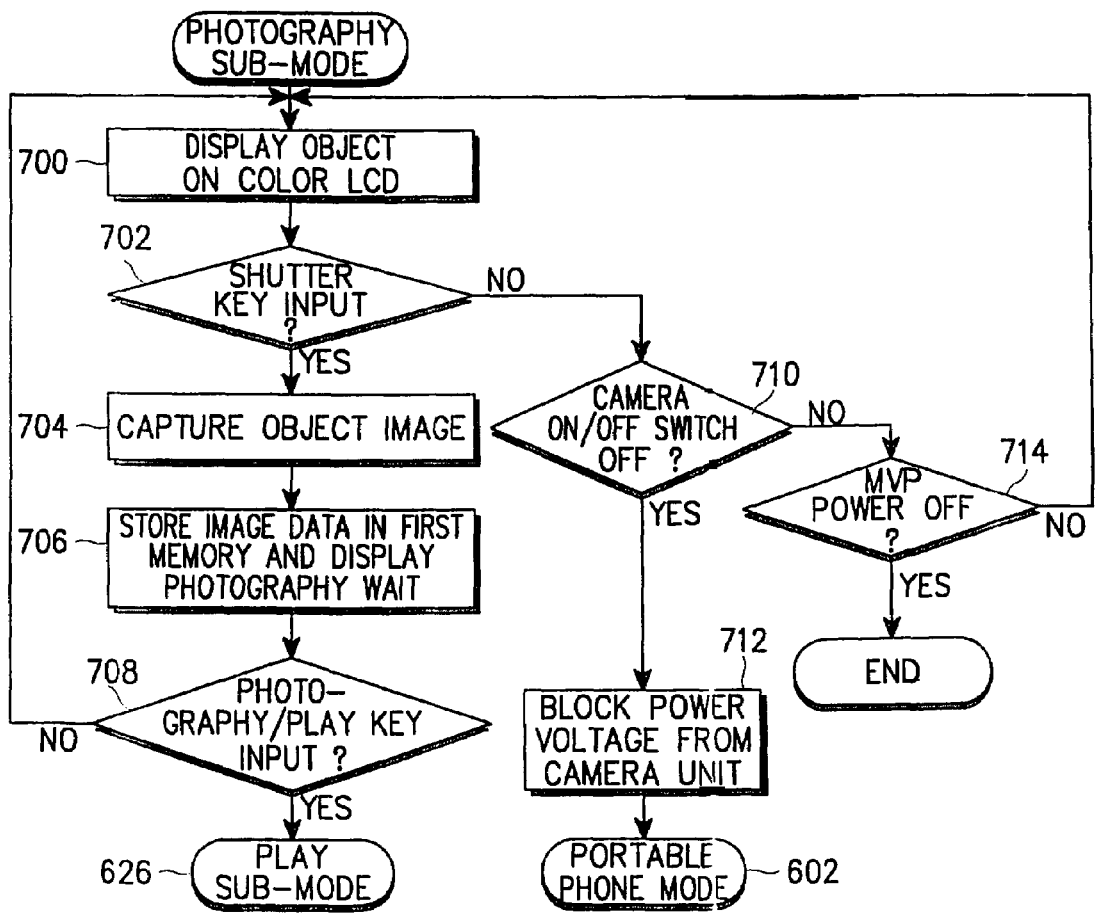
FIG. 7 is a flowchart depicting a control operation of the portable composite communication terminal in a photography sub-mode of the camera mode according to the embodiment of the present invention.

Referring to FIG. 7, there is shown a flowchart illustrating a control operation in the MVP in a photography sub-mode of a camera mode. When the photography sub-mode is set in step 624 of FIG. 6, the camera controller 24 controls an object in sight of the camera lens to be displayed on the color LCD 48 in step 700. The object is temporarily stored in the third memory 28 through the lens portion 10, the CCD 12, the CDS/AGC 14, the ADC 16, the DSP 18, and the camera controller 24 and then displayed on the color LCD 48 through the camera controller 24, the DSP 18, the selector 44, and the LCD driver 46.

The user views the intended object on the color LCD 48 acting as a view finder and presses the shutter key 306 on the frontal side of the MVP as shown in FIG. 3A to capture the image of the object in step 702. The portable phone controller 32 controls the camera controller 24 to photograph the object at the time point when the user presses the shutter key 306 in step 704. Then, the portable phone controller 32 controls the camera controller 24 to store the captured image data in the first memory of the camera unit 2, while controlling the OSD 40 to display a photography wait message on the color LCD 48, in step 706. Text characters "WAIT" can be an example of the photography wait message.

In step 708, it is determined whether the photography/play key 316 is entered in the current photography sub-mode. In the absence of the input of the photography/play key 316, the procedure returns to step 700. Upon input of the photography/play key 316, the photography sub-mode is toggled to the play sub-mode in step 626 of FIG. 6.

Meanwhile, if the shutter key 316 is not entered in the photography sub-mode in step 702, the portable phone controller 32 determines whether the camera on/off switch 318 is off in step 710. In the off-state of the camera on/off switch 318, the portable phone controller 32 controls the camera controller 24 to block a power voltage from the camera unit 2 in step 712 and returns to the portable phone mode in step 602 of FIG. 6. On the contrary, in the on-state of the camera on/off switch 318, the portable phone controller 32 determines in step 714 whether the MVP is powered-off. If the MVP is powered-off, the portable phone controller 32 ends the procedure, and otherwise, it returns to step 700 of FIG. 7.

Figure 8:
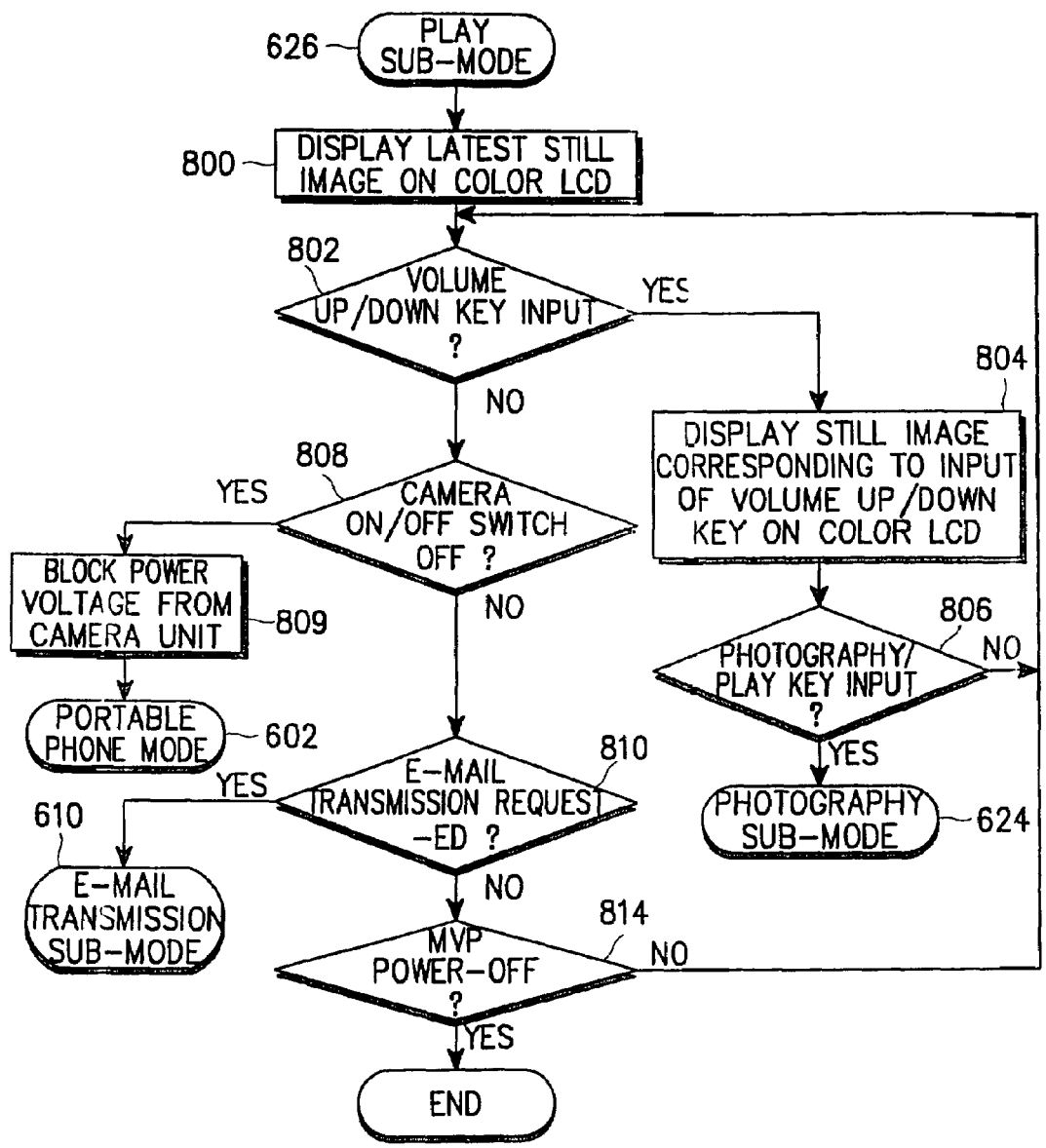
FIG. 8 is a flowchart depicting an operation of the portable composite communication terminal in a play sub-mode of the camera mode according to the embodiment of the present invention.

The control operation of the MVP in the play sub-mode of step 614 will be described in more detail referring to FIG. 8. Referring to FIG. 8, there is shown a flowchart illustrating a control operation in the MVP in a play sub-mode of the camera mode. The play sub-mode allows the user to view a captured image on the color LCD 48 and can be performed in the camera mode.

Upon selection of the play sub-mode, the portable phone controller 32 controls the camera controller 24 to display the latest captured still image on the color LCD 48 in step 800. That is, the camera controller 24 reads out the last stored still image from the first memory and displays it on the color LCD under the control of the portable phone controller 32.

Upon the pressing of the volume up/down key 312 in this situation, the portable phone controller 32 controls the camera controller 24 to display a captured still image on the color LCD 48 depending on the volume up/down input. For example, the next still image is displayed on the color LCD for the input of the volume-up key data and the previous still image is displayed on the color LCD 48 for the input of the volume-down key data.

The portable phone controller 32 determines whether the photography/play key has been entered in step 806. Upon entry of the photography/play key 316, the play sub-mode is toggled to the photography sub-mode in step 624 of FIG. 6 and otherwise, the portable phone controller 32 returns to step 802.

If the volume up/down key 312 is not entered in step 802, the portable phone controller 32 determines whether the camera on/off switch 318 is off in step 808. In the off-state of the camera on/off switch 318, the portable phone controller 32 controls the camera controller 24 to block the power voltage from the camera unit 2 in step 809 and then returns to the portable phone mode in step 602. In the on-state of the camera on/off switch 318, the portable phone controller 32 determines whether an E-mail transmission has been requested from the user in step 810. Upon user request for the E-mail transmission, the portable phone controller 32 returns to the E-mail transmission sub-mode in step 610. By selecting the E-mail transmission sub-mode in the play sub-mode, the user can transmit an E-mail with a still image enclosed therein.

If the E-mail transmission sub-mode is not set in step 810, the portable phone controller 32 determines whether the MVP is powered-off in step 814. If the MVP is powered-off, the portable phone controller 32 ends the procedure, and otherwise, the portable phone controller 32 returns to step 802.

In the E-mail transmission sub-mode, an E-mail is transmitted in accordance with the embodiment of the present invention. Before describing the transmission/reception of an E-mail message and image data in detail, a description of a communication system and network for transmission/reception of an E-mail message and image data will be presented referring to FIGS. 4 and 5.

Figure 4:
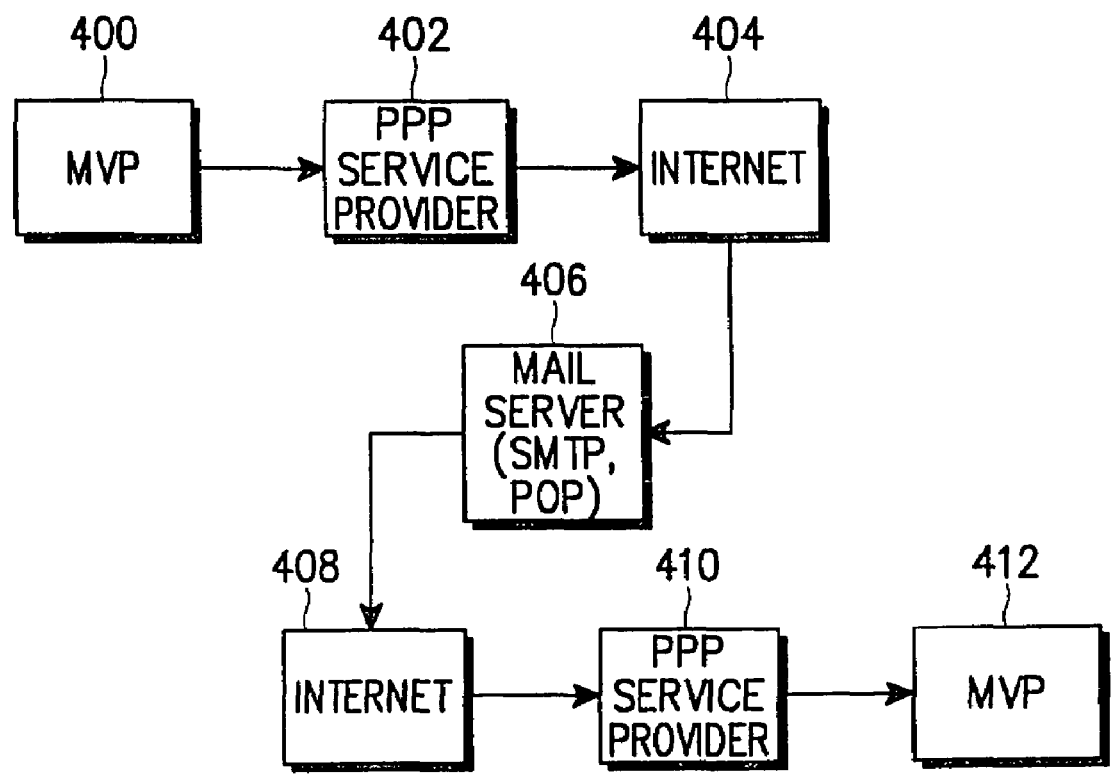
FIG. 4 is a block diagram of a system for transmission of image data and E-mail data between portable composite communication terminals according to the embodiment of the present invention.

Referring to FIG. 4, there is shown a concept view of the inter-MVP image data or E-mail transmitting system according to the embodiment of the present invention. An MVP 400 transmits an E-mail or image data to an E-mail server 406 through a PPP service provider 402 and an Internet 404. The E-mail server 406 in turn transmits the received E-mail or image data to another MVP 412 through an Internet 408 and a PPP service provider 410. The E-mail server 406 includes an SMTP (Sending Mail Transfer Protocol) server and a POP (Post Office Protocol) server for transmitting the E-mail and image data from the E-mail server 406.

Figure 5:
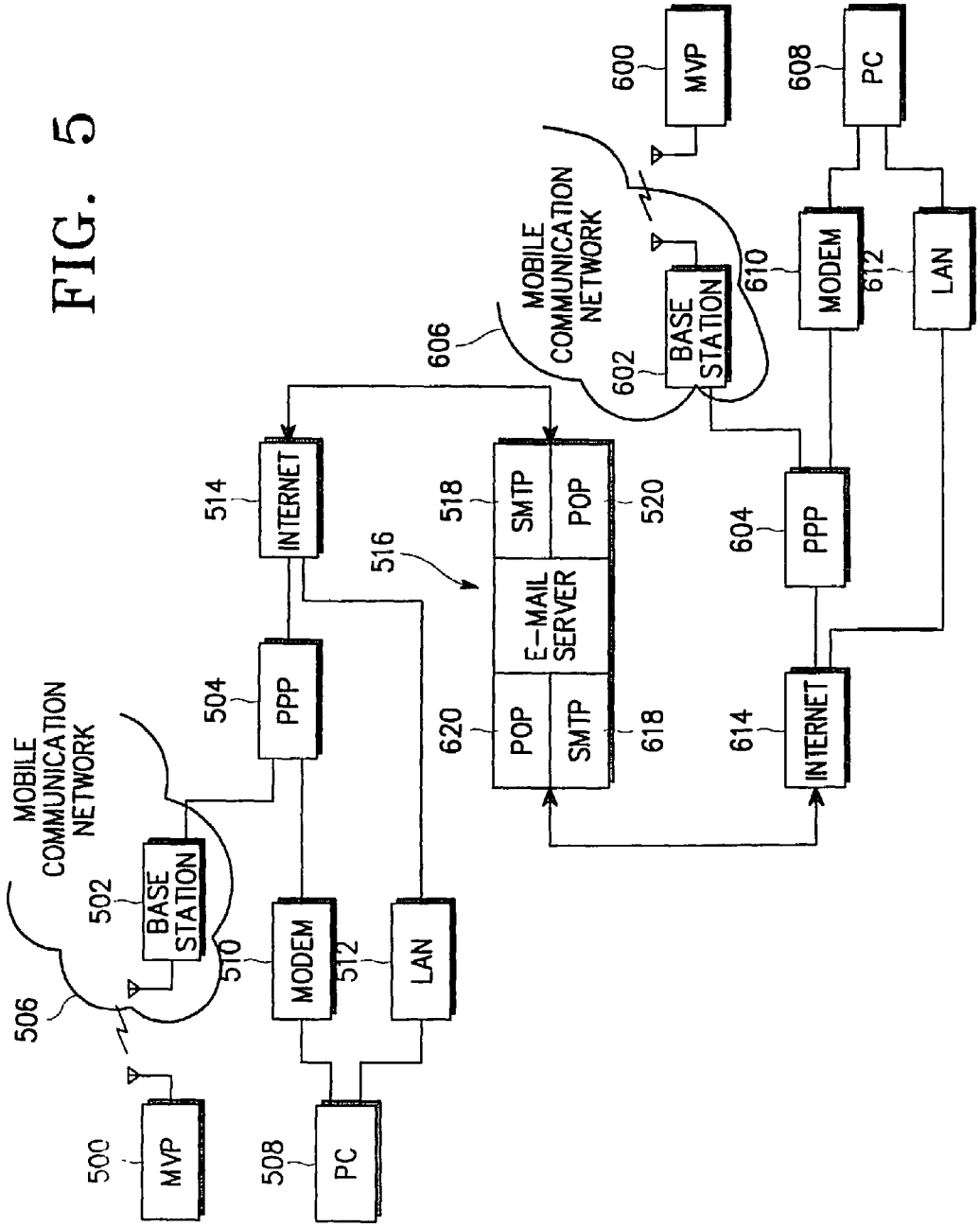
FIG. 5 is a block diagram of a communication system in which the portable composite communication terminal can be used according to the embodiment of the present invention.

Referring now to FIG. 5, there is shown a block diagram of a communication system for transmitting/receiving voice and image data using the MVP of the present invention. The communication system includes MVPs 500 and 600, base stations 502 and 602 communicating with the MVPs 500 and 600, PPP servers 504 and 604, Internets 514 and 614 connected to the PPP servers 504 and 604, an E-mail server 516 connected to the Internets 514 and 614, PCs 508 and 608, MODEMS 508 and 608 connected between the PCs 508 and 608 and the PPP servers 504 and 604, and LANs (Local Area Networks) 512 and 612 connected between the PCs 508 and 608 and the Internets 514 and 614. The base stations 502 and 602 belong to mobile communication networks 506 and 606, and the E-mail server 516 includes SMTP servers 518 and 618 for receiving an E-mail and image data and POP servers 520 and 620 for transmitting an E-mail and image data.

An application program for E-mail is stored in the fourth memory 36 of the portable phone unit 4, therefore, the MVP can perform an E-mail function without an extra connection to a computer. In accordance with the embodiment of the present invention, the data packet communication standard, IS-657 is applied for implementation of an E-mail function, and images are appended to the contents of an E-mail by a compression method as provided by the international still image compression standard, JPEG.

Figure 9:
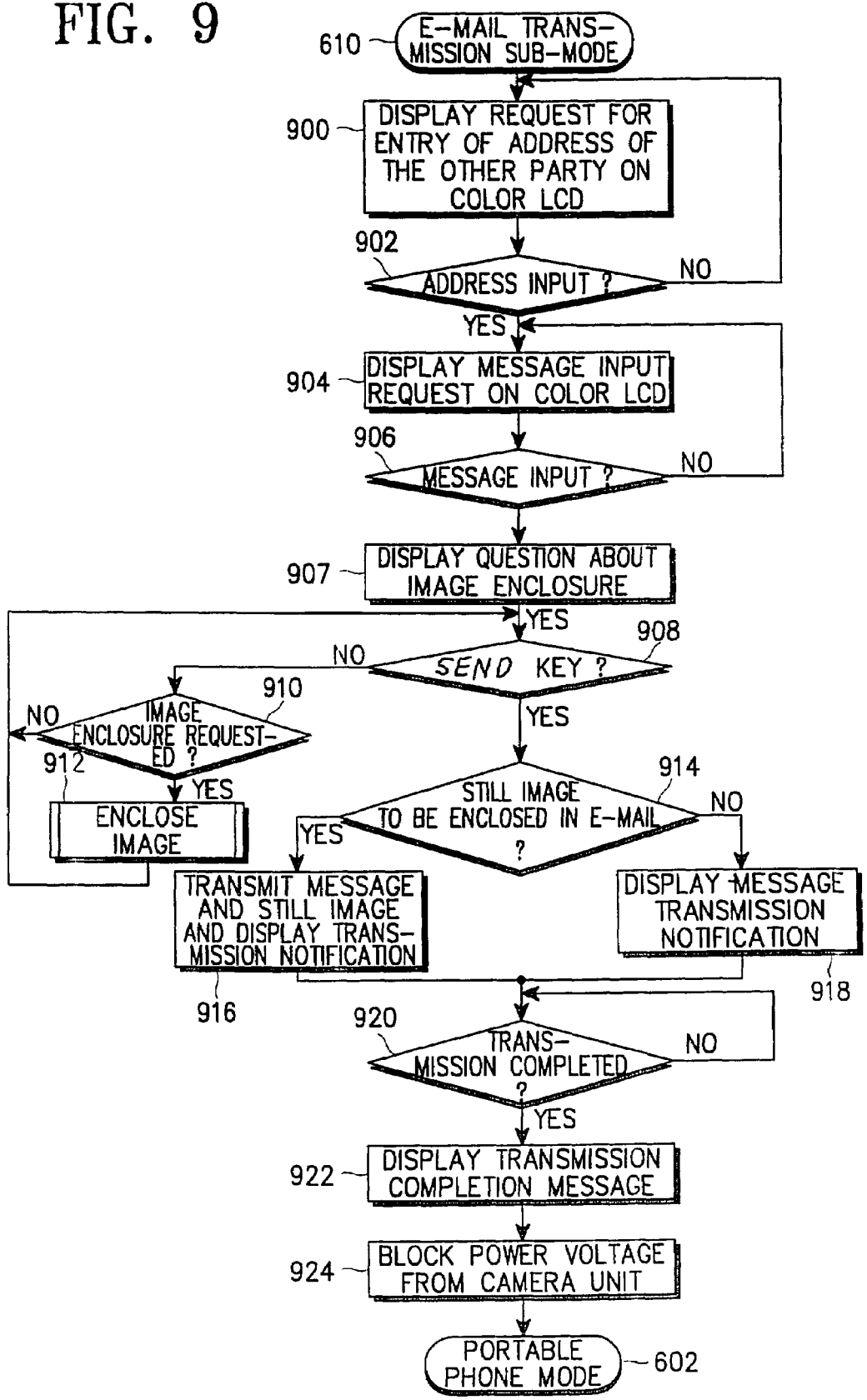
FIG. 9 is a flowchart depicting a control operation for transmission of an E-mail message and image data in the portable composite communication terminal according to the embodiment of the present invention.

Transmission of image data and an E-mail will be described in detail with reference to FIGS. 1 to 5 and FIG. 9. An MVP user can select an E-mail transmission sub-mode in a portable phone mode or in a play sub-mode of a camera mode. Referring to FIG. 9, there is shown a flowchart illustrating a control operation for transmitting E-mail and image data in the MVP according to the embodiment of the present invention.

Upon selection of the E-mail transmission sub-mode, the portable phone controller 32 controls the OSD 40 to display a message requesting entry of the address of the other party on the color LCD 48 in step 900 of FIG. 9. When the user enters the address of the other party through the key pad 34 in step 902, the portable phone controller 32 requests entry of a message (title and contents) to the user through the color LCD 48 in step 904. Upon user entry of the message in step 906, the portable phone controller 32 displays a message asking whether an image is to be enclosed on the color LCD 48 in step 907.

The user presses a key corresponding to image enclosure if he wants to enclose an image in the E-mail transmission sub-mode. Therefore, if the user directly presses a send key, this implies that no image is enclosed in the E-mail transmission sub-mode. In step 908, the portable phone controller 32 determines whether the send key has been entered. Upon entry of the send key, the portable phone controller 32 proceeds to step 914, and otherwise, the portable phone controller 32 determines whether the image enclosure key has been entered in step 910. Upon user request for image enclosure in step 910, the portable phone controller 32 performs a control operation to enclose an image in the E-mail in step 912. The image enclosure operation is performed in steps 626, 800, 802, and 804. After step 912, the portable phone controller 32 returns to step 908.

Meanwhile, upon entry of the send key in step 908, the portable phone controller 32 determines whether there is any still image to be enclosed in the E-mail. If the E-mail transmission sub-mode is selected in the play sub-mode of the camera mode, this implies that image data to be enclosed in the E-mail exists. If the image enclosure operation is implemented in the E-mail transmission sub-mode selected in the portable phone mode, as in step 912, this implies that image data to be enclosed in the E-mail exists. However, if only the E-mail transmission sub-mode is selected in the portable phone mode, this implies that no image data enclosed in the E-mail exists.

In the presence of a still image to be enclosed in the E-mail in step 914, the portable phone controller 32 transmits the received message (title and contents) and the enclosed still image to the E-mail server 510 in packets, while displaying a message indicating E-mail transmission on the color LCD 48, in step 916. In the absence of a still image to be enclosed in the E-mail in step 914, the portable phone controller 32 transmits the received message (title and contents) to the E-mail server 510 in packets, while displaying the message indicating E-mail transmission on the color LCD 48 in step 918.

Upon completion of the E-mail transmission in step 920, the portable phone controller 32 displays a message indicating completed transmission on the color LCD 48 in step 922 and blocks a power voltage from the camera unit 2 in step 924. Thus, the portable phone controller 32 enters the portable phone mode 602.

Packet transmission of an E-mail with a still image enclosed therein in step 916 of FIG. 9 will be described in more detail. Still image data is transmitted by the data block size of a typical digital still video camera, for example, by 512 byte units, between the camera unit 2 and the portable phone unit 4 in the MVP, and the MVP transmits data in packets to the E-mail server 516. A packet is of length 584 bytes, including a 536-byte data block, an 8-byte header, a 20-byte TCP (Transmission Control Protocol), and a 20-byte IP (Internet Protocol).

For packet transmission, the portable phone controller 32 reads still image data of about 40 Kbytes in 512 byte units from the first memory 22 of the camera unit 2 and temporarily stores the read data in the fourth memory 36 of the portable phone unit 4. Then, the 512-byte long image data is appended to the message (tile and contents) of an E-mail and the resulting message is loaded in the data block of 536 bytes. In this manner, the image data is transmitted in packets.

Assuming that the still image of about 40 Kbytes and the contents of the E-mail message are about 60 Kbytes, the MVP can transmit data of about 70 Kbytes including data and a header of a packet for about 60 seconds at 9600 bps (=70 Kbytes×8). Here, 9600 bps is a data transmission rate in a CDMA system.

Referring back to FIG. 5, the MVP 500 connects to the PPP server 504 through the base station 502 and a PPP service provider 504 and then to the E-mail server 516 using the TCP/IP protocol. The MVP 500 can upload an E-mail having image data enclosed therein to the E-mail server 516 using the POP server 520 of the E-mail server, or download an E-mail or an E-mail having image data enclosed therein from the E-mail server 516 using the SMTP server 518 of the E-mail server 516.

Upon receipt of an E-mail, the E-mail server 516 notifies a terminal of the other party, for example, the PC 608 or the MVP 600 of the arrival of the E-mail.

Figure 10:
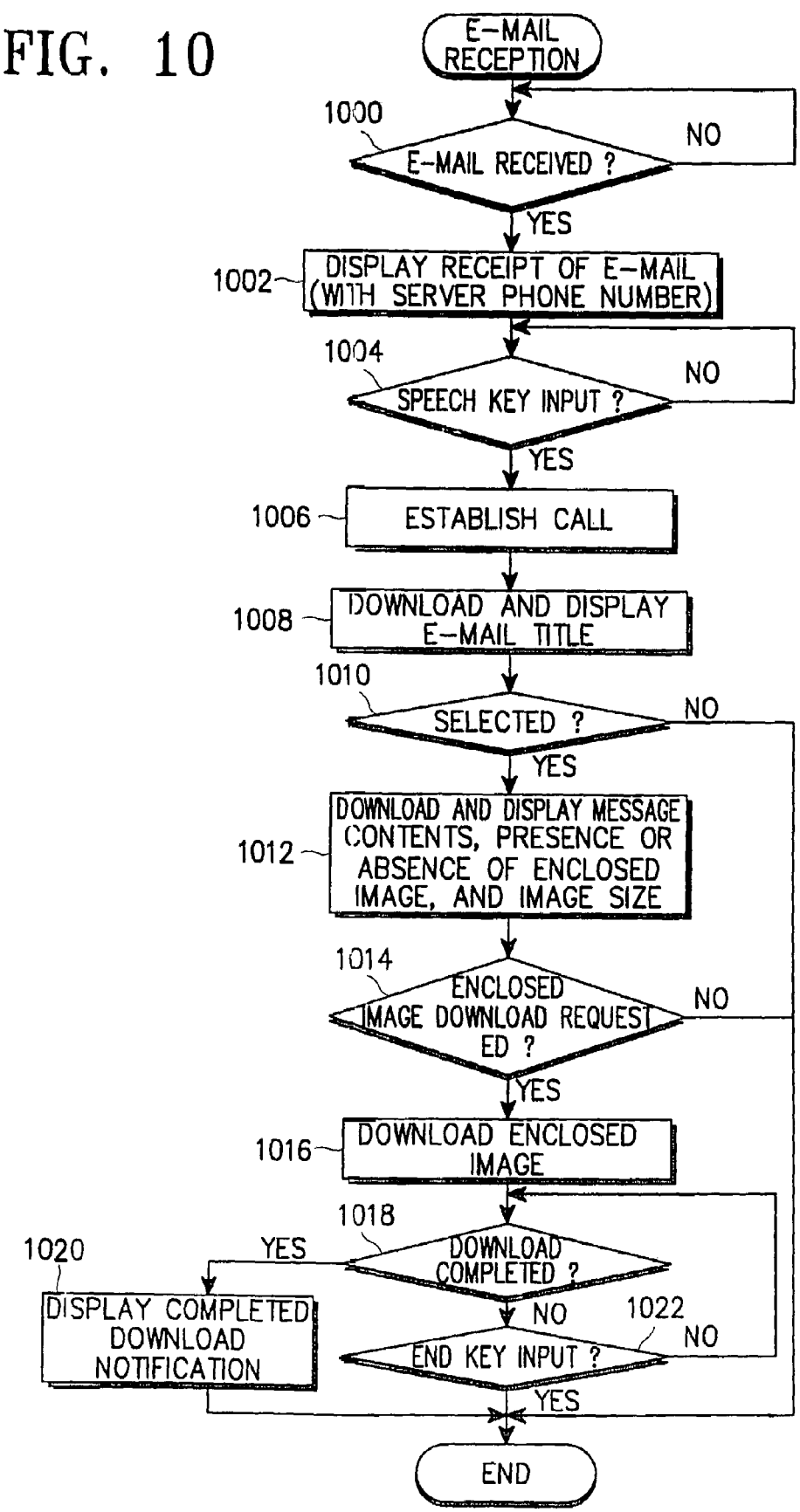
FIG. 10 is a flowchart depicting a control operation for receipt of an E-mail message and image data in the portable composite communication terminal according to the embodiment of the present invention.

Referring to FIG. 10, there is shown a flowchart illustrating a control operation for reception of an E-mail and image data in the MVP according to the embodiment of the present invention. Upon receipt of an E-mail in step 1000, the portable phone controller 32 of the MVP displays a message notifying receipt of the E-mail and a server phone number on the color LCD 48 in step 1002. If the user enters the send key in the key pad 34 to check an E-mail message, the portable phone controller 32 establishes a call with the E-mail server in step 1006. In step 1008, the portable phone controller 32 downloads the tile of the E-mail and displays it on the color LCD 48 in step 1008. When the user presses a specific key to read the E-mail message in step 1010, the portable phone controller 32 downloads message contents, information about the presence or absence of enclosed image data, and the file size of the enclosed image, and displays the downloaded information on the color LCD 48 in step 1012.

Then, when the user requests downloading the enclosed image in step 1014, the portable phone controller 32 downloads the enclosed image in step 1016. In step 1018, the portable phone controller 32 determines whether the download is completed. Upon completion of the download, the portable phone controller 32 displays a message indicating completed downloading on the color LCD 48 in step 1020. On the other hand, if the download is not completed, the portable phone controller 32 determines whether a an end key has been entered in step 1022. To suspend the download for such a reason as a long download time, the user just presses the end key. The portable phone controller 32 determines whether the end key has been entered in step 1022. Upon input of the end key, the portable phone controller 32 ends the procedure.

As described above, the MVP of the present invention acts as both a general portable communication terminal and a digital camera. Accordingly, it can play back photographed images, transmit/receive images, and perform voice communication.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A data transmitting method for a portable composite communication terminal which functions as both a portable phone and a camera, comprising the steps of:

entering a first E-mail transmission sub-mode upon user request for E-mail transmission while operating in a portable phone mode, the first e-mail transmission sub-mode performing a portable phone function;

entering a second E-mail transmission sub-mode upon user request for E-mail transmission while operating in a display sub-mode, the second e-mail transmission sub-mode displaying an image most recently captured in a camera mode;

sequentially displaying other images stored in a memory through the use of scroll keys;

transmitting the address of the other party and a message received through a user interface in the first E-mail transmission sub-mode; and transmitting the address of the other party and the message received through the user interface and the image displayed on the display as an E-mail in the second E-mail transmission sub-mode.

* * * * *

UNITED STATES PATENT AND TRADEMARK OFFICE
CERTIFICATE OF CORRECTION

PATENT NO. : 7,577,460 B2  Page 1 of 1
APPLICATION NO. : 11/493754
DATED : August 18, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 570 days.

Signed and Sealed this

Fourteenth Day of December, 2010

David J. Kappos
*Director of the United States Patent and Trademark Office*